(12) United States Patent
Busby et al.

(10) Patent No.: US 9,803,674 B2
(45) Date of Patent: Oct. 31, 2017

(54) THIN GEL GASKET AND A METHOD OF MAKING AND USING THE SAME

(71) Applicant: Aviation Devices & Electronic Components, L.L.C., Fort Worth, TX (US)

(72) Inventors: Jeff Busby, Millsap, TX (US); David Schmidt, Egg Harbor Township, NJ (US); Kent Boomer, Aledo, TX (US); Matt Boyd, Fort Worth, TX (US)

(73) Assignee: The Patent Well LLC, Fort Worth, TX (US)

( * ) Notice: Subject to any disclaimer, the term of this patent is extended or adjusted under 35 U.S.C. 154(b) by 80 days.

(21) Appl. No.: 14/704,030

(22) Filed: May 5, 2015

(65) Prior Publication Data

US 2015/0322988 A1 Nov. 12, 2015

Related U.S. Application Data

(60) Provisional application No. 61/988,949, filed on May 6, 2014.

(51) Int. Cl.
*B64C 1/12* (2006.01)
*F16B 19/00* (2006.01)
(Continued)

(52) U.S. Cl.
CPC .......... *F16B 19/008* (2013.01); *B32B 15/016* (2013.01); *B32B 15/095* (2013.01); *B32B 15/20* (2013.01); *B64C 1/00* (2013.01); *B64C 1/12* (2013.01); *C09J 5/00* (2013.01); *C09J 7/0225* (2013.01); *C09J 7/0232* (2013.01); *F16B 19/00* (2013.01); *F16B 19/04* (2013.01);
(Continued)

(58) Field of Classification Search
CPC .......... F16B 19/008; F16B 19/04; B64C 1/12; B64C 1/00; C09J 5/00
USPC ......................................................... 244/131
See application file for complete search history.

(56) References Cited

U.S. PATENT DOCUMENTS 2,679,468 A 5/1954 Pitman
3,030,260 A 4/1962 Metzler
(Continued)

FOREIGN PATENT DOCUMENTS

EP 0730017 9/1996

OTHER PUBLICATIONS

International Search Report, Intl. Appl. No. PCT/US2015/029232, Aviation Devices & Electronic Components, L.L.C., 9 pages Jul. 28, 2015.

(Continued)

*Primary Examiner* — Timothy D Collins
*Assistant Examiner* — Keith L Dixon
(74) *Attorney, Agent, or Firm* — Jackson Walker, LLP

(57) ABSTRACT

A thin, cured gel gasket is disclosed, including methods of making the thin gel gasket and the use of the thin gel gasket in an aircraft joint. In one embodiment, the thin gel gasket has no skeleton or other structure and is comprised of only a cured polyurethane gel and has a thickness of less than about 12 mill. It is manufactured using a release film that is adapted in a number of ways to make release from the gel prior to use easier. In one method of making and using the thin gel gasket. it is applied to a joint which is subject to compression, in one embodiment, a lap joint of an aircraft fuselage.

17 Claims, 6 Drawing Sheets

(51) Int. Cl.
*B64C 1/00* (2006.01)
*C09J 5/00* (2006.01)
*F16B 19/04* (2006.01)
*F16J 15/14* (2006.01)
*B32B 15/01* (2006.01)
*C09J 7/02* (2006.01)
*B32B 15/095* (2006.01)
*B32B 15/20* (2006.01)

(52) U.S. Cl.
CPC ........... *F16J 15/14* (2013.01); *B32B 2581/00* (2013.01); *C09J 2205/30* (2013.01); *Y10T 29/49959* (2015.01)

(56) References Cited

U.S. PATENT DOCUMENTS

| | | | |
|---|---|---|---|
| 3,107,195 | A | 10/1963 | Stegler et al. |
| 7,850,387 | B2 | 12/2010 | Chapin |
| 7,879,955 | B2 | 2/2011 | Rao et al. |
| 8,138,273 | B2 | 3/2012 | Rao et al. |
| 8,356,772 | B2 * | 1/2013 | Bense ................ B64C 1/12 244/119 |
| 8,387,994 | B2 | 3/2013 | Stehmeier et al. |
| 8,651,422 | B2 * | 2/2014 | Noebel ............... B64C 1/068 244/119 |
| 8,691,033 | B1 | 4/2014 | Busby et al. |
| 8,707,534 | B2 | 4/2014 | Apfel |
| 2001/0038180 | A1 | 11/2001 | Gaines et al. |
| 2004/0041356 | A1 | 3/2004 | Smith et al. |
| 2008/0254214 | A1 * | 10/2008 | Kassa ................... C09J 5/00 427/207.1 |
| 2009/0020917 | A1 | 1/2009 | Henning |
| 2011/0308701 | A1 | 12/2011 | Lavery et al. |
| 2013/0075526 | A1 * | 3/2013 | Griess ................. B32B 5/26 244/123.1 |
| 2013/0273342 | A1 | 10/2013 | Johnson et al. |
| 2014/0334868 | A1 * | 11/2014 | Apfel ................. B60R 13/00 403/267 |
| 2015/0291273 | A1 * | 10/2015 | Elze ................. B64C 1/069 244/120 |
| 2017/0137671 | A1 | 5/2017 | Ogomi et al. |

OTHER PUBLICATIONS

International Search Report, PCT/US2015/029232, filed May 5, 2015, 8 pages Jul. 28, 2015.

3M EMI/EMC Electronic Materials, Solutions for Today's Electronics, EMI Shielding Tapes, EMI Grounding Adhesives and Gaskets, 12 pages May 1, 2014.

Characteristics of Adhesives and Adhesive Joints, Adhesives, Assignment Help, www.expertsmind.com/top/adhesives, 2 pages Mar. 17, 2014.

Hanson Rivet & Supply Co., Largest Stock—Rivets, Rivet Nuts, Rivet Tools & Machines—Since 1929, www.roymech.co.uk, 7 pages Jan. 24, 2014.

Corrosion Control—Sealing Faying Surfaces, Lee H. Erb, EAA Chap 1000 Det 5, Arlington TX; EAA Chap 34, www.eaa1000.av.org, 5 pages Jun. 30, 1997.

* cited by examiner

THIN GEL GASKET AND A METHOD OF MAKING AND USING THE SAME

This application claims the benefit of, priority to, and incorporates herein by reference U.S. Patent Application Ser. No. 61/988,949, filed May 6, 2014.

FIELD OF THE INVENTION

Gaskets, more specifically, a thin pre-cured gel sealing member for in one use a lap joint, such as a lap joint on a fuselage of an aircraft, and methods for making such a gasket and a lap joint.

BACKGROUND OF THE INVENTION

Resilient materials are provided for sealing complementary overlapping edges of aircraft on an aircraft fuselage, such as on lap joints or at other locations. A number of problems may be encountered with lap joint sealants. They must be dimensionally appropriate; they must provide an effective environmental seal; they must be adapted to receive rivets; they must maintain resiliency and avoid creep under load; they must be able to withstand repeated thermal and pressure cycling; and they must be cost effective taking into account labor, manufacturing, installation, and in-service. Typically, prior art sealant materials tend to be a compromise.

Air and watertight seals are sometimes created by the use of cured in-place materials, where two parts are mixed together, then applied very thinly to a sealing surface, and allowed to cure after assembly—wet installed. In some assemblies the use of a thin, precured gel, such as polyurethane gel may be desirable. Applicants have found, however, that there are difficulties in handling very thin gel, in particular a gel with no skeleton and less than about 12 mil thick. It tends to come apart very easily as it is tacky and, being thin and lacking structural integrity (no skeleton) may stick to the release paper upon which it is placed.

Applicant has heretofore used gaskets, gasket tape, and other sealants, as well as a method for making gaskets and other sealants as set forth in the following issued patents that are incorporated herein by reference: U.S. Pat. Nos. 6,530,577; 6,695,320; 7,229,526.

Applicant has found certain problems inherent in the manufacture and use of very thin polyurethane only (no skeleton) gaskets.

SUMMARY OF THE INVENTION

A thin, cured gel gasket is disclosed, including methods of making the thin gel gasket and the use of the thin gel gasket in an aircraft joint. In some embodiments, the thin gel gasket has no skeleton or other structure and is comprised of only a stretchable, cured polyurethane gel and has a thickness of less than about 12 mill. The gasket may be manufactured using a release film that is adapted in a number of ways to make release from the gel prior to use easier. In certain methods of making and using the thin gel gasket, it is applied to a joint which is subject to compression, such as, for example, a lap joint of an aircraft fuselage.

A joint for use on an aircraft fuselage is also disclosed. The joint may include: a first aluminum panel (or one made of other suitable material) having an outer edge portion; a second aluminum panel having an outer edge portion; a multiplicity of rivets, each having a rivet head and rivet shaft, the rivets for joining the two panels along facing overlapping outer edge portions; a sealant between the overlapping edge portions, the sealant comprising a resilient cured polyurethane gel gasket having a tacky body. In some embodiments, the gasket has a thickness of less than 12 mil uncompressed. The gasket may have a thickness of between about 1-6 mil when compressed between the two panels. In certain embodiments, at least some of the multiplicity of rivets may include a tacky polyurethane uncured gel mix on the shaft thereof. The gel mix may be cured after a few minutes. The gel mix is uncured when first applied. The joint further may include a temporary tack decreasing agent on a surface of the gasket. The joint may, for example, be a lap joint, a double lap joint, a tapered lap joint or a snap joint.

An aircraft having a fuselage is disclosed, the fuselage comprising: multiple partially overlapping panels, the overlap comprising multiple lap joints; wherein the lap joints comprise facing surfaces with rivets, the facing surfaces with a thin, tacky, cured, deformable, resilient polyurethane preformed gasket therebetween; wherein the compressed gasket thickness is less than about 6 mil.

A method of joining adjacent overlapping panels on an aircraft fuselage is disclosed, the method comprising: obtaining a thin, cured polyurethane gasket tape having a first, tacky side and release paper on a second side; applying the first, tacky side to an outer edge of one of either an inner panel or an outer panel of the overlapping panels; positioning an outer edge of the other panel of the overlapping panels adjacent the gasket tape such that an overlap width approximates a tape width; removing the release paper from the second side of the gasket tape before the following step; and joining the panels with rivets so the edges hold the gasket tape under compression.

A method of manufacturing a thin gel gasket assembly is also disclosed. The method may include: providing a release film that has been adapted to easily release from a thin gel gasket; applying an uncured mix of the gel to the adapted release film to a thickness of 12 mil or less; and allowing the gel to cure. The release film of the providing step, in certain embodiments, has multiple perforations therethrough. The release film of the providing step is, in some embodiments, at least partly coated with release agent. The release film of the providing step is, in particular embodiments, meltable.

In an effort to meet these environmental seal problems, Applicants provide, in certain embodiments, a thin, polyurethane-only (no skeleton) sealant, gasket or tape as more particularly set forth below. A method of making and using the same in a lap joint assembly is also provided.

In certain embodiments, there is provided a lap joint for use on an aircraft fuselage. The lap joint may include a first aluminum panel having an edge portion; a second aluminum panel having an outer edge portion; a multiplicity of rivets joining the two panels along complementary overlapping edge portions; a sealant, such as a tape, for placement between the overlapping edge portions, the sealant, in one embodiment, consisting essentially of a cured polyurethane tape gasket having a tacky upper and lower surface, the gasket having a pre-compression thickness of between about 2-12 mil, more preferably, about 6-8 mil, wherein the multiplicity of rivets includes an uncured polyurethane mix applied immediately upon mixing and before curing to the rivets and/or panel rivet holes, just before installation of the rivets, wherein optionally a temporary tack decreasing agent is applied to either or both of the edge portion(s) of the panels and/or the surfaces of the gasket, prior to contacting the gasket with the panel(s).

There is provided, in particular embodiments, a method of manufacturing a thin, tacky polyurethane gasket. The method may include: applying a thin film about 2-12 mil thick, of an uncured polyol/isocynate mix to at least one release film that has a low bonding cohesion with respect to the polyurethane; allowing the polyurethane to cure; removing the release film; and applying the gasket to a lap joint of an aircraft.

DETAILED DESCRIPTION OF THE ILLUSTRATED EMBODIMENTS

Figure 1:
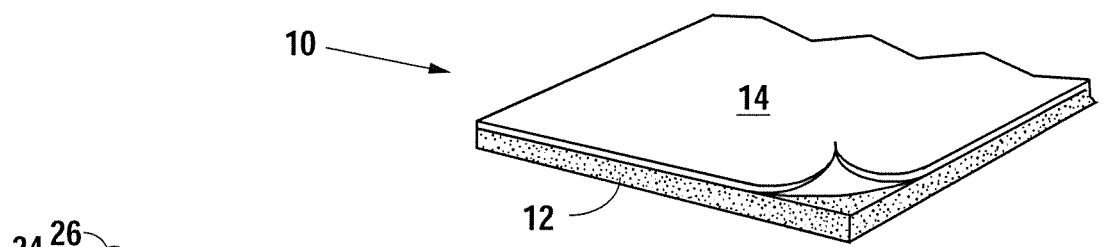
FIG. 1 illustrates a gasket assembly comprising a tacky polyurethane gasket with release film on one or both sides for use in making a lap joint.
Figure 2A:
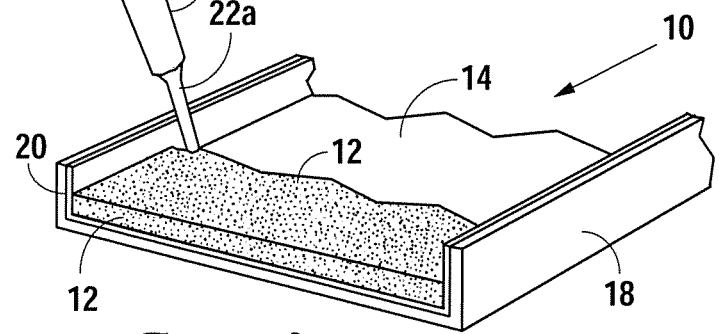
FIGS. 2A, 2B, and 2C illustrate a method of making a tacky polyurethane gasket for use in a lap joint or other assembly.
Figure 3A:
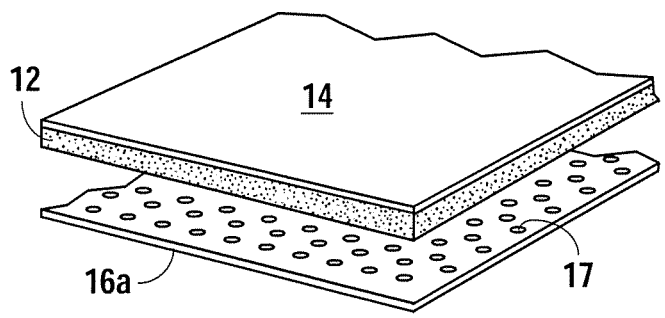
FIGS. 3A, 3B, and 3C illustrate a gasket having a bottom or top film that is perforated or mesh-like (FIG. 3A); dissolvable (FIG. 3B); or, heat meltable (FIG. 3C).
Figure 3B:
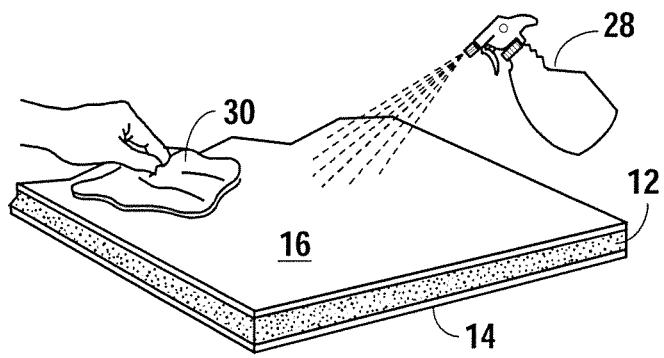
Figure 3C:
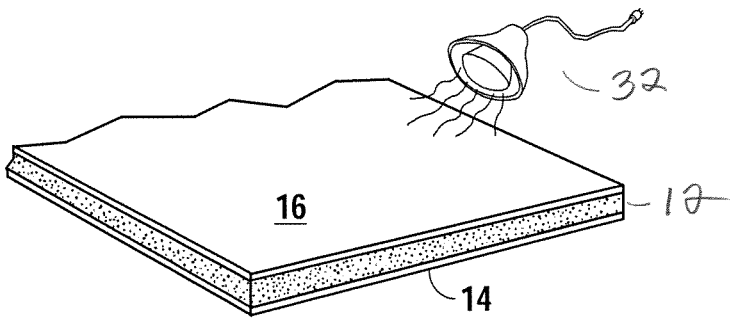
Figure 3D:
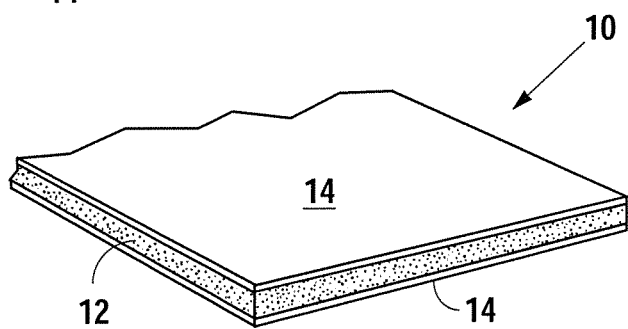
FIG. 3D illustrates a gasket assembly comprising two release films, one on the top and one on the bottom of a thin, cured tacky polyurethane gasket.
Figure 4A:
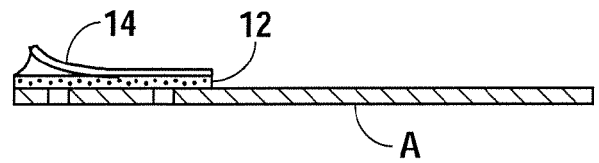
FIGS. 4A, 4B, 4C, 4D, 4E, 4F, and 4G illustrate a method using applicant's thin skeleton-less gasket on an aircraft fuselage to create a lap joint.
Figure 4B:
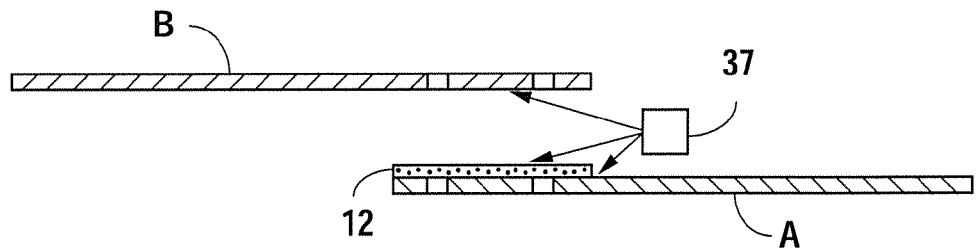
Figure 4C:
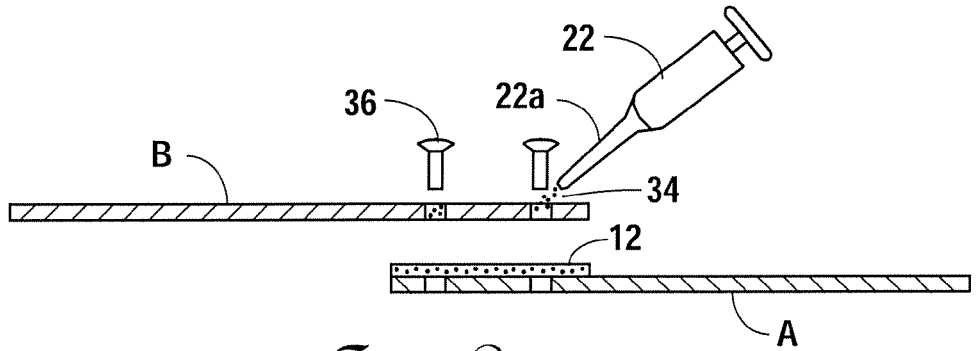
Figure 4D:
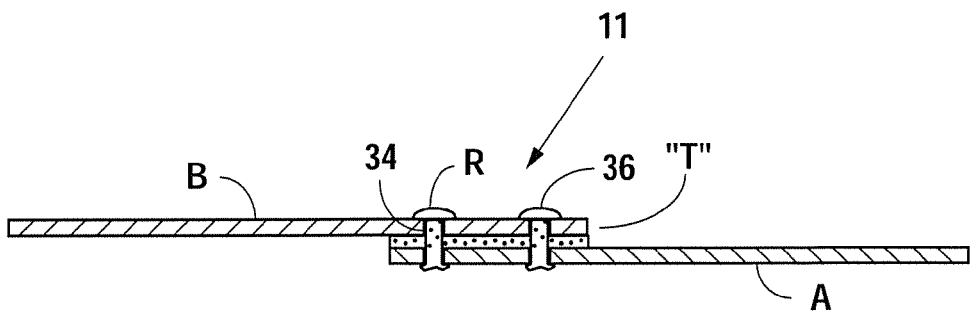
Figure 4E:
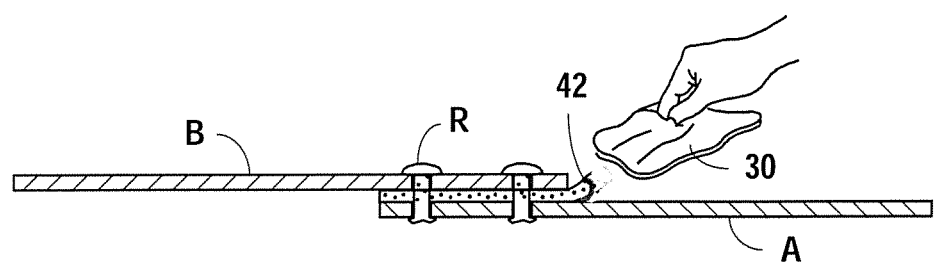
Figure 4F:
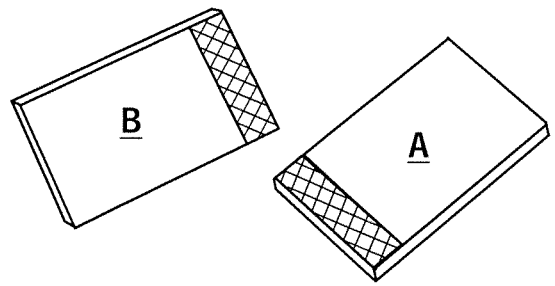
Figure 4G:
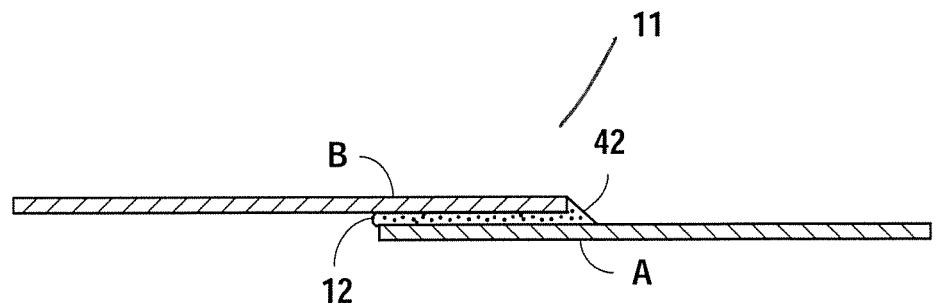

Applicant provides, as seen in FIGS. 1, 2D, and 3D, a gasket assembly 10, including a gasket 12, the gasket comprised of tacky, cured polyurethane for use, in one embodiment, in a lap joint 11 (see FIGS. 4D and 4F). A lap joint 11 may include a first panel A and a second, adjacent panel B, the two panels of an aircraft fuselage overlapping and riveted together with a series of rivets R (or other attaching hardware) and with gasket 12 therebetween. Gasket 12 will create an effective environmental seal and help prevent corrosion of the panels at the joint. In a preferred embodiment, gasket 12 is, prior to placement on the workpiece, is part of the gasket assembly 10 which includes a release film 14 on at least one side thereof, the other side being tacky (see FIG. 1) or having a release film 14 on both sides. In one form, a thin, cured polyurethane gasket 12 is provided (see FIG. 3D). As further set forth below, release film 14 is not placed between the two overlapping riveted panels, but is simply useful in handling, prior to placement of gasket 12 on the workpiece, of gasket assembly 10 as the polyurethane of gasket 12 may be tacky and tacky or dimensionally somewhat unstable. The release film is removed after the tacky side is attached to the workpiece surface as set forth in more detail below. Thus, gasket assembly 10 is used to refer to gasket 12 having at least one release film 14 on the upper or lower surface thereof or on both surfaces.

Gasket 12, in one embodiment, has an uncompressed thickness of about 2 to 12 mils or, more preferably, about 6 to 8 mils, which thickness is the thickness as applied (see FIG. 4B) prior to any compression between members A and B of the lap joint. Compression between the panels may cause some thinning and squeeze out as gasket 12 is both tacky, deformable and subject to flow or squeeze out 42 under compression, see FIG. 4E. Compressed thickness as, for example, in a lap joint, may be less than about 6 mil.

The composition of gasket 12 may be found in the patents incorporated herein by reference and is typically pre-cured, that is, cured prior to placement between panels A and B (see FIG. 4F) in a manner more specifically set forth below. The patents incorporated herein by reference are: U.S. Pat. Nos. 6,530,577; 6,695,320; and 7,229,516. In a preferred embodiment, there is no skeleton in gasket body 12. Handling and making the gasket with polyurethane that is tacky and is thin as set forth in the ranges set forth above, creates some unique problems that are typically not present in dealing with polyurethane gaskets that are thicker, such as those having bodies between about 15 and 55 mil thickness, for example.

A. Methods of Making the Thin Gasket

Figure 2B:
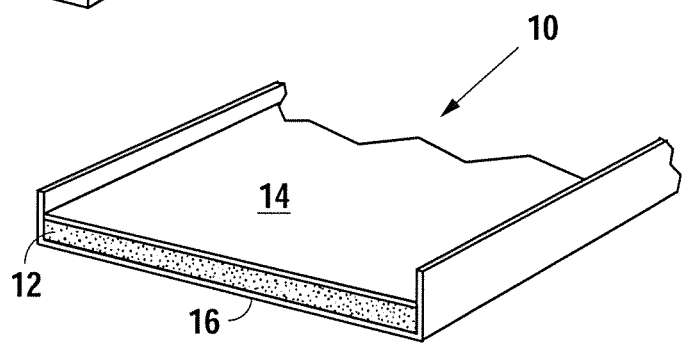
Figure 2C:
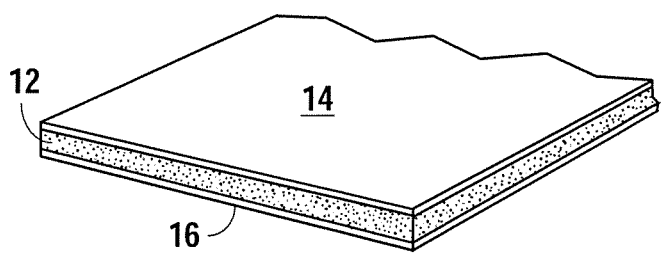

One of the difficulties in working with a thin polyurethane gasket is in the manufacture of the gasket. FIGS. 2A, 2B, and 2C illustrate a method of manufacturing gasket assembly 10 that may overcome some of these difficulties. Gasket assembly 10 is seen to be, in one embodiment elongated, in the nature of a tape having a quite a small thickness, a larger width, and an even substantially larger length. Width may be, for example, about 0.05 inches to 18 inches, and length may be about 80 inches to 218 inches.

In one embodiment, a flat, level mold 18 is provided having a bottom wall and side walls and an open top. The mold may be about 2' wide and about 12' long. A bottom film 16 (a release film designated with 16 because of its placement beneath uncured mix) of release film or film is laid either across the bottom or across the bottom and at least partially up the sides of the mold. In one embodiment, a two-part polyurethane comprising a polyol 24 and an isocyanate 26 is injected into mold 18 using a mixing cartridge 22 that has a nozzle 22a for mixing the two parts. The volume of the mix injected is known and set so that it provides the selected body thickness, for example, about 0.006-0.008". The mix will chemically react and set (cure) at ambient temperature in mold 18 on top of bottom film 16. Before it sets, it, being self-leveling, will be spread out or may be leveled with a handheld straight edge. Bottom film 16 is provided for the releasing, post-curing of the tacky gasket polyurethane material from the mold.

FIG. 2B illustrates the cured polyurethane which cured upon bottom film 16 and upon which, after it is cured, a second release film 14 has been placed as a top film. Removal of polyurethane gasket body 12 with the bottom film 16 attached thereto is achieved as by lifting out. Following removal, a sharp knife may be used to produce a number of smaller width tape strips—for example, about twenty four one-inch strips.

It has heretofore been difficult to remove the release films from a thin polyurethane gel gasket 12. In an effort to help achieve clean removal of the release film, several solutions are set forth below B. Physical Configuration or Chemical Composition of the Release Film In FIG. 3A, a specific embodiment 16a of bottom film 16 is shown to be perforated with multiple small holes 17 and thus may be removed more easily than if it were a solid film. In the same form, this may be used as a release film on the top surface of the cured gel also.

In FIG. 3B (shown with gasket assembly inverted after removal from the mold to show bottom film 16 on top), a second specific embodiment 16b of film 16 is provided with water or chemical dissolvability. For example, water from a spray container 28 or damp cloth 30 may be applied to such dissolvable film and the film allowed to dissolve. This is in lieu of a mechanical separation as used in FIG. 3A above, with perforated film 16a. Adhesive Research provides a dissolvable film, including a water dissolvable film, that may be tailored in thickness, dissolution rate, texture, and tensile strength (see www.adhesiveresearch.com).

In FIG. 3C, a heat meltable film 16c is provided as a bottom film for the manufacturing of a thin polyurethane gel gasket. Following removal of the gasket assembly from the mold 18, a heat lamp or other heat source 32 may be provided on or adjacent heat reactive meltable film 16c to remove it from gasket 12.

FIG. 3D illustrates that when gasket body 12 is removed from a mold and a bottom film removed from the surface thereof, another release film 14 may be placed on the cured top surface so it is easy to handle by a user. This second release film is placed on cured gel so its removal may not be as problematic as film 16. In one embodiment, the top release film is in the same nature as bottom film 16 or it may be made from another material such as FET (Fluoro ?).

C. The Use of a Release Agent Applied to the Film Release

Figure 5A:
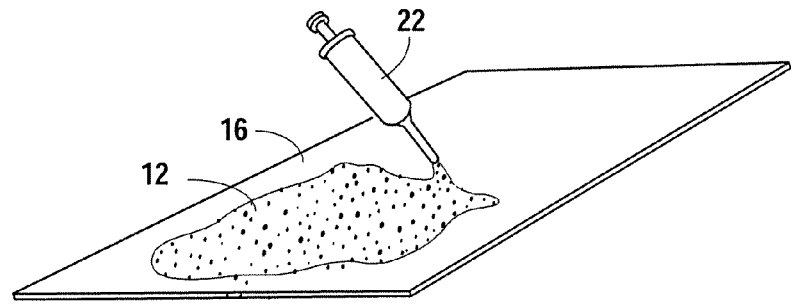
FIG. 5A illustrates in isometric view another method for making a thin polyurethane gasket.

FIG. 5A illustrates a preferred alternate embodiment of making a very thin polyurethane-only tape, wherein no mold is used, just a flat bottom film 16, which may be a bottom film with any of the clean release qualities set forth herein. A two-part polyol isocyanate mix 24/26 is applied to the top surface of the bottom film 16. It may be applied in a known volume on a bottom film marked by a rectangle or other shape. The rectangle will show the area on which to spread the known volume of mix to give the desired "thinness." An S-shaped motion of handheld mixing cartridge 22 will help application of the mix and a handheld straightedge may be used to help level—though in a preferred embodiment, the mix may be self-leveling. It will spread out somewhat and typically is applied (uncured) in an elongated stream (with the consistency of motor oil) and will start to set up and cure after it has spread out "width-wise."

By controlling the speed at which one moves the mixing cartridge across the film and the rate of mix application, one can with experience obtain a thin, relatively wide strip. A top film may be placed on it, for example, after curing. Then it may be cut in multiple strips, lengthwise, to the desired width. In either method, leveling and a selected "thinness" may be further controlled by using a rigid roller 40 having end ridges 41, such as that shown in FIGS. 5C and 5D. This is done with a top release film in place and before the mix is fully cured. In an alternate method, the roller may be made from or coated with a polyurethane non-stick material.

Figure 5B:
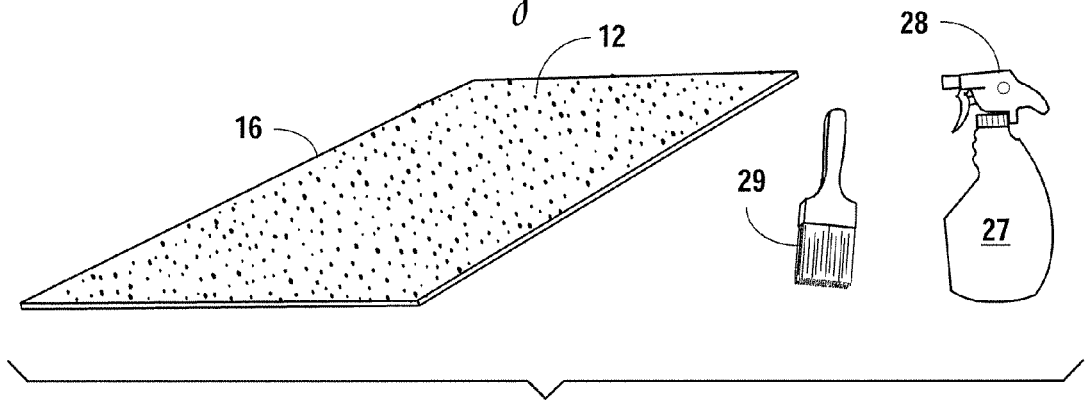
FIG. 5B illustrates a method of preparing a bottom film so that it releases cleanly from a polyurethane that has cured on it.
Figure 5C:
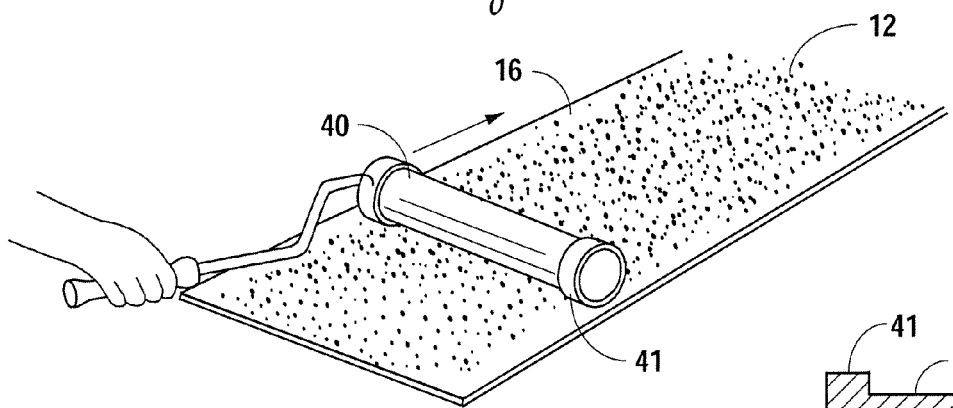
FIGS. 5C and 5D illustrate a device for and method of obtaining a controlled thickness on a thin polyurethane sealing member.
Figure 5D:
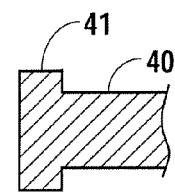

FIG. 5B illustrates another manner in which release may be obtained from the polyurethane mix that cures in place on bottom film 16. In this application, a release agent 27 in liquid, dust or other suitable form may be applied to the bottom film before the uncured mix is applied thereto. Such an agent should be inert and non-volatile as regards to the polyurethane and may be applied with a brush 29, a spray application 28 or any other suitable method. One such material that may be applied is a hydrophobic material known as Rain-X®. Another is sold under the trademark PAM®. PAM® is made from a vegetable oil, typically canola oil, and Rain-X is a hydrophobic silicon polymer that also helps with release of cured polyurethane gel. The primary active ingredients in Rain-X are polysaloxines. In one embodiment, films 14/16, for example, when used with the method set forth in FIG. 5A above, may be glass, plastic or FET with Rain-X or other release agent 27 applied thereto, which Rain-X bonds well with the glass, but does not bond the polyurethane and thus allows easy release. Other release agents are wax, oil and other compositions as set forth in Publication No. US 2009/0020917, which publication is incorporated herein by reference.

Certain types of release film may work by being physically altered, chemically altered or receiving a release agent on the surface thereof as set forth in FIG. 5B. These include: Teflon, PET, PVC, PP, nylon, FEP (fluorinated ethylene propolene), and polyurethane. Any of the foregoing or any other film may be adapted as set forth herein.

D. Joint Assemblies Using Applicant's Thin Polyurethane Gel Tape

FIGS. 4A-4G illustrate a lap joint 11 wherein a single-sided tacky (release film on one side only) tape embodiment may be applied along a complementary edge of panel A, such as aluminum panel of the fuselage of an aircraft. The edge of gasket 12 is aligned with the edge of the panel. The bottom side is tacky polyurethane and will immediately adhere to the location at which it is placed with only a minimal ability to move it after it touches. This requires careful alignment and placement of the tape, tacky side down. However, the placement of the gasket may be less critical, if the edge of panel A and panel B, or the surfaces of gasket 12, are first treated with a temporary tack reduction material 37, FIG. 4B. This renders them temporarily non-tacky to the polyurethane. Temporarily is in the nature of minutes, typically, up to about 5-20 minutes, during which there may be some relative movement between gasket body 12 and either the lower and/or the upper panels. This ability to move allows careful alignment of the gasket along one panel and careful alignment of the second panel with respect to the first panel and the gasket. Alignment is especially important if the panels are pre-drilled for the placement of rivets (or other attaching hardware) therein and, thus, require careful alignment of the rivet holes.

FIG. 4B shows a container of such material 37, which may be applied to both the underside of panel B or the upper surface of gasket 12 or (not shown) the upper surface panel A or the bottom surface of the gasket before it is applied. Application may be by any means, such as brush, spray, cloth (wipe on) or a thin film or a solid liquid or the like.

The compositions that may be used in this step illustrated in FIG. 4B include the aforementioned compositions used for treating the surface of the bottom film. They are typically non-reactive to aluminum or other metals and, thus, usually contain no acids and are inert and non-volatile. While the ability to do some "post contact" adjustment of the work-pieces (panels A and B) with respect to the tacky, thin gasket is important, the nature of the compositions applied to the various surfaces to allow one to make alignment adjustments. Applicants' gasket is deformable and flow somewhat under compression and therefore spreads. Any material 37 or release agent 27 should not contain any material that would cause corrosion or inhibit the environmental seal that tacky, cured polyurethane produces between the adjacent compressed panels. Isopropyl alcohol is one material 37 that may be applied by spraying, in one embodiment that will help temporarily inhibit the stickiness between the work-piece and gasket 12.

FIGS. 4C and 4D illustrate that, after alignment of the holes for the receipt of rivets 36 (or other attaching hardware), a wet seal 34 may be applied from an applicator 33.

In one embodiment, wet seal 34 may be an uncured two-part polyurethane mix 24/26, which mixes in the nozzle of the applicator, which will cure in place at ambient temperature when applied around the rivet hole before or during the insertion of the rivets (or other attaching hardware) through the holes with the gasket 12 lying therebetween. Such a wet seal, such as Self Leveling Green or Self Leveling Red, is available from AVDEC located at 1810 Mony Street, Fort Worth, Tex. 76102. It is applied to and around the rivet holes and/or on the rivet prior to affixing the rivet between the two panels A/B and will help, after curing, create a good environmental seal and help prevent liquids or moisture from accessing to the space around the rivet holes between the panels, where they overlap through the rivet holes. Indeed, the wet seal may be used for creating the lap joint. Even when no gasket is used.

FIG. 4D illustrates lap joint 11 where panels A and B may be under compression between their edge portions. Compression typically occurs during the process of fastening the rivets to the panels. Because Applicant's thin polyurethane gel gasket 12 is relatively soft, squeeze out 42 may occur at the lap joint edges is seen in FIG. 4E. A cloth 30 that may be soaked with isopropyl alcohol or other appropriate medium may be used to wipe down the squeeze out to give a tapered edge (see FIG. 4G) or flat, which conforms to the panel edges (see FIG. 4D).

Figure 6A:
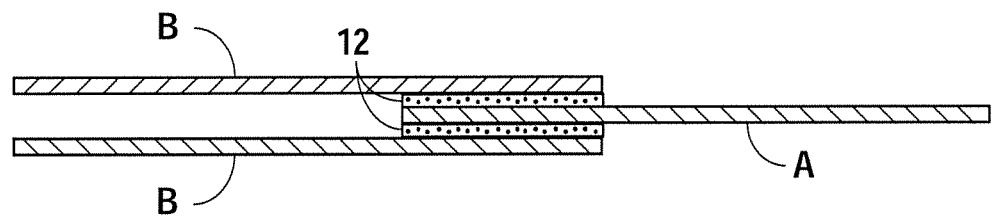
FIGS. 6A, 6B and 6C illustrate additional uses of applicants, then gasket, namely a double lap joint, a tapered joint and a snap joint, respectively.
Figure 6B:
Figure 6C:

Additional embodiments appropriate for receiving applicants thin skeleton less gasket conclude include double lap joints FIG. 6A, tapered lap joints, FIG. 6B, and snap joints, FIG. 6C. The aluminum of the joints may be aluminum alloy or any other material, lap joint referring to the physical position of the overlapping panels. While the term "gasket" is used, with a tape being a gasket with a particular geometry, a gasket may be a pre-cured sealant for placement between two pieces. Lap joints are used in many manufacturing processes and in a number of vehicles, including trains and motor homes. The overlapping sections, such as aluminum panels, may be treated or untreated. If treated, it may have a conversion coating (for corrosion control) or a paint coating (may include a corrosion inhibiting primer).

Although the invention has been described with reference to specific embodiments, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A device for use with a vehicle fuselage having a first panel and a second panel, the panels having overlapping edge portions, and fasteners, such as rivets, for applying compression to the overlapping portions, the device comprising:
   a sealant for placement between the overlapping edge portions of the panels, the sealant comprising a resilient, cured, deformable, skeleton-free, polyurethane body having a tacky polyurethane upper surface and a tacky polyurethane lower surface; and
   at least one release film for placement against at least one of the upper or lower surfaces of the sealant, the release film for removal from the sealant before placement of the sealant between the overlapping edge portions;
   wherein the release film ids dissolvable in a liquid.

2. The device of claim 1, wherein the sealant has an uncompressed thickness of less than 12 mil.

3. The device of claim 1, wherein the sealant has an uncompressed thickness of between 2 and 12 mil.

4. The device of claim 1, wherein the sealant is configured to have a compressed thickness of between about 1-6 mil.

5. The device of claim 1, wherein the device further includes tacky uncured polyurethane gel, as a wet seal proximate at least some of the rivets.

6. The device of claim 1, further including a temporary tack decreasing agent on at least one of the upper or lower surface of the sealant.

7. The device of claim 1, wherein the at least one release film is one release film on one of the upper or lower surface of the sealant and further including a second release film on the other of the upper or lower surface of the sealant.

8. The device of claim 1, wherein the release film is dissolvable in a liquid.

9. The device of claim 1, wherein an inert agent is applied to a surface of the release film which engages the sealant.

10. A device for use with a vehicle fuselage having a first panel and a second panel, the panels having overlapping edge portions, and fasteners, such as rivets, for applying compression to the overlapping portions, the device comprising:
    a sealant for placement between the overlapping edge portions of the panels, the sealant comprising a resilient, cured, deformable, skeleton-free, polyurethane body having a tacky polyurethane upper surface and a tacky polyurethane lower surface; and
    at least one release film for placement against at least one of the upper or lower surfaces of the sealant, the release film for removal from the sealant before placement of the sealant between the overlapping edge portions;
    wherein the release film is an FEP (fluorinated ethylene propylene) sheet.

11. The device of claim 10, wherein the sealant has an uncompressed thickness of less than 12 mil.

12. The device of claim 10, wherein the sealant has an uncompressed thickness of between about 2 and 12 mil.

13. The device of claim 10, wherein the sealant is configured to have a compressed thickness of between about 1-6 mil.

14. The device of claim 10, wherein the device further includes tacky uncured polyurethane gel, as a wet seal proximate at least some of the rivets.

15. The device of claim 10, further including a temporary tack decreasing agent on at least one of the upper or lower surface of the sealant.

16. The device of claim 10, wherein the at least one release film is one release film on one of the upper or lower surface of the sealant and a second release film on the other of the upper or lower surface of the sealant.

17. The device of claim 10, wherein an inert agent is applied to a surface of the release film which engages the sealant.

* * * * *